No. 642,549. Patented Jan. 30, 1900.
P. KENNEDY.
DRIVING BELT.
(Application filed June 22, 1899.)
(No Model.)
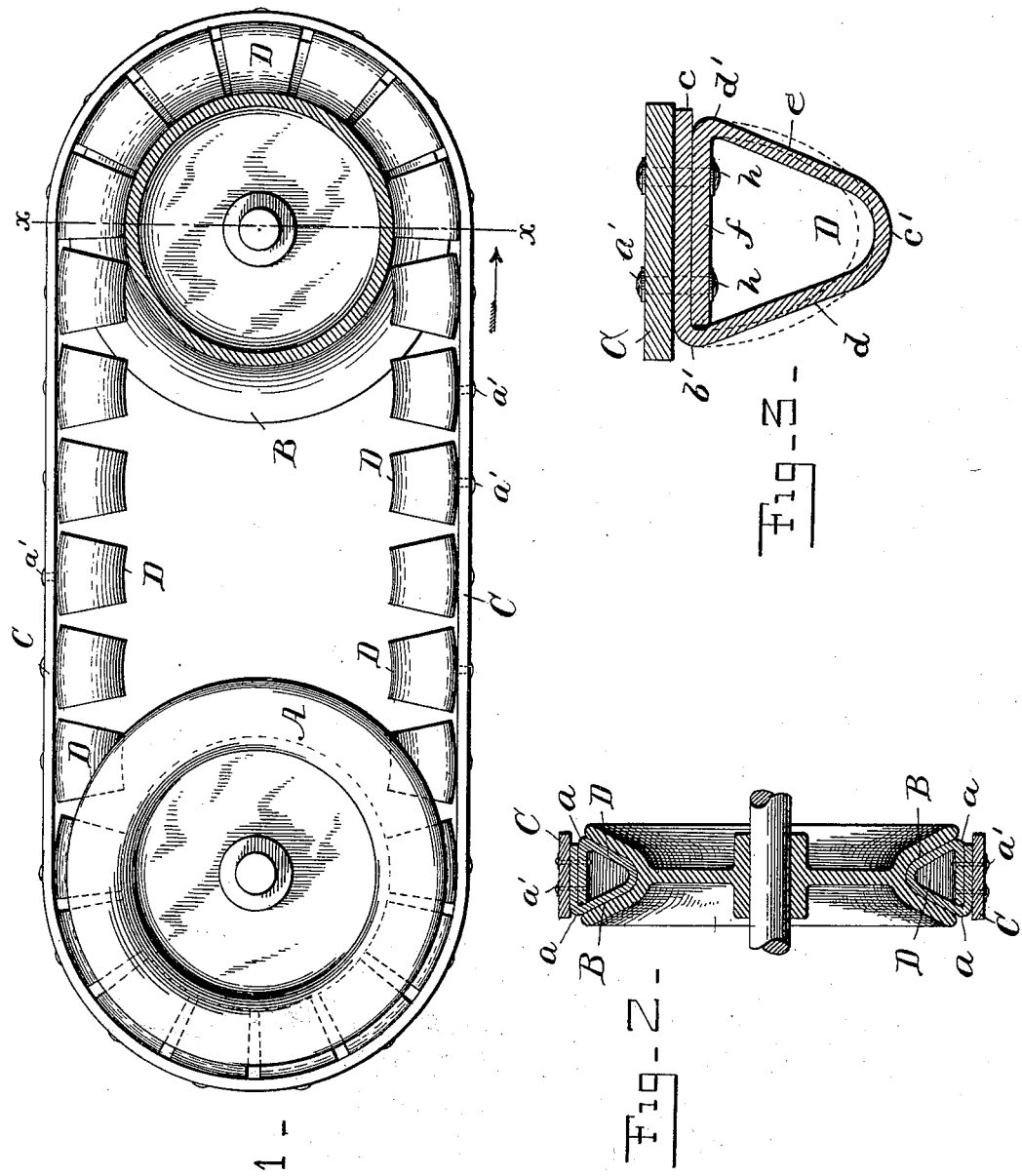
WITNESSES:
F. N. Roehrich
Edward Kelly.
INVENTOR
Patrick Kennedy
BY
James A. Whitney
ATTORNEY

UNITED STATES PATENT OFFICE.

PATRICK KENNEDY, OF NEW YORK, N. Y.

DRIVING-BELT.

SPECIFICATION forming part of Letters Patent No. 642,549, dated January 30, 1900.

Application filed June 22, 1899. Serial No. 721,436. (No model.)

*To all whom it may concern:*

Be it known that I, PATRICK KENNEDY, a citizen of the United States, residing in the borough of Brooklyn, in the city and State of New York, have invented certain new and useful Improvements in Driving-Belts; and I do hereby declare that the following is a full, clear, and exact description of the same, reference being had to the accompanying drawings, making a part of this specification, in which—

Figure 1 is a side and partial sectional view of an apparatus made according to my invention. Fig. 2 is a transverse sectional view taken in the line $xx$ of Fig. 1. Fig. 3 is a detail sectional view, on a larger scale, of one part of said apparatus.

This invention relates to that class of belts for transmitting power and motion which are used in connection with circumferentially grooved or channeled pulleys and which are provided on their bearing-faces with series of lugs which in cross-section correspond more or less to the cross-section of the grooves or channels of the pulleys on which they run; and it comprises certain novel means whereby the utility of this class of driving-belts is very greatly increased under all the varied conditions of practical use and when used in connection with pulleys of differing diameters or with pulleys placed close together.

The object of my invention is to provide a power-transmitting belt which shall be free from the above-mentioned defects and drawbacks and which shall be practically equal to spur-gearing in the positiveness of the motion transmitted, while at the same time the advantages of belt transmission of power are preserved. I attain this object by the novel constructions and combinations of parts hereinafter fully set forth and explained.

A and B are pulleys, from one of which to the other power and motion are to be transmitted. Each of these pulleys is circumferentially grooved or channeled, as shown at $a$ in Fig. 2. To secure the best results, the form of these channels in cross-section should approximate a V shape, as illustrated in said figure.

C is a flat endless strap of leather or any other suitable material—such, for example, as ordinary machine-belting. Upon the inner or working surface of this endless strap is placed a series of lugs D, each of which in its cross-section corresponds more or less to the shape in cross-section of the channel in the periphery of the pulleys. The lugs of the series are placed at a slight distance apart, as shown in Fig. 1, and each at its inner and outer side is curved, as illustrated in said figure, each lug constituting, so to speak, the "sector" of a ring, the radius of the shorter curve of which should not be materially different from the radii of the pulleys, or when the pulleys are of different diameters the radius of the curve of the inner surface of the lug should be the same or practically the same as the radius of the smaller of the two pulleys. The lugs are attached at the backs or convex surface to the inner surface of the strap at or near the middles of said surfaces, as shown on drawings at $a'$ in Fig. 1. Said lugs instead of being solid and non-elastic are elastic in a sense which permits the shape of their cross-sections to be changed according to the conditions under which the belt is run. Thus, as shown in Fig. 3, the continuous lines show the normal external shape of a lug made according to my invention when intended to run on pulleys the circumferential channels of which are substantially or approximately triangular in cross-section, while the dotted line illustrates the shape which it may readily assume from differences which may occur between the shape of the pulley-channel and the shape of the lug under various changes and vicissitudes of condition in the use and operation of the apparatus. It will be seen that the lugs made according to my invention, whatever their cross-section, are hollow and formed with resilient walls.

The structure of the lugs, whatever their cross-section, may vary within broad limits without departing from my invention. The most simple and economical construction known to me at the present time is that shown in Fig. 3, in which the material of the lug, preferably of leather of requisite strength, firmness, and stiffness and molded by pressure to the required shape, has a portion $c$ which rests flat upon the contiguous inner surface of the strap, the material being folded, as at $b'$, to form one side $d$ of the lug, then turned, as at $c'$, thence to $d'$ to form the side $e$, and then flat, as at $f$, against the flat part $c$, the parts $c$ and $f$ being lapped one upon the other and both of them made fast to the strap by rivets $h$, passed through all three, as shown in dotted outlines in said figure. The lug is thus made substantially triangular in its cross-section and hollow, with resilient walls. When the strap is tightened to bring the lugs deeper into the circumferential grooves of the pulleys, the narrow ends of the lugs being brought more snugly against the bottoms of the grooves are crowded or compressed, with the result that the sides of the lugs are caused to bulge or expand, as shown in the dotted curved line in Fig. 3, and are thus brought more firmly against the sides of the channels in the peripheries of the pulleys. This proportionally increases the grip of the lugs—in other words, of the belt—upon the pulleys and prevents the slipping of the lugs upon the pulleys when suddenly-increased strain or speed is thrown upon the apparatus. Moreover, the hollow and elastic structure of the lugs enables them to adjust themselves readily to pulleys of different diameters by the self-adjustment of their gripping-surfaces to the curvatures and shapes of the pulleys upon which they run and to adapt themselves to the several conditions of use which arise when the pulleys are located very close together.

What I claim as my invention is—

1. As a new article of manufacture a lug for power-transmitting belts triangular or approximately so in cross-section made hollow and with resilient walls, substantially as herein set forth.

2. The combination with an endless strap of a series of hollow lugs triangular or approximately so in their cross-section having resilient walls and adapted to run on pulleys having circumferential channels of like section, substantially as herein set forth.

3. The combination with an endless strap of a series of curved hollow lugs having resilient walls and means for securing the lugs to the strap at or near the middles of their convex sides, substantially as herein set forth.

4. The combination with an endless strap of hollow lugs having resilient walls each composed of a sheet or strip of material folded upon itself to form the lug and to provide inwardly-turned end portions for attachment to the strap, substantially as herein set forth.

5. The combination with an endless strap of a series of hollow lugs having resilient walls and each composed of a sheet of material folded to form the lug with the end portions of said material lapped one upon the other, and rivets which secure said lapped portions to the strap, substantially as herein set forth.

PATRICK KENNEDY.

Witnesses:
E. L. CHANEY,
J. A. WHITNEY.